(12) United States Patent
Kozlowski

(10) Patent No.: US 7,748,129 B2
(45) Date of Patent: Jul. 6, 2010

(54) APPARATUS AND METHOD FOR MEASURING THE TRIGONOMETRIC COSINE AND TRIGONOMETRIC SINE OF AN ANGLE

(76) Inventor: Jesse Kozlowski, 10 B Lakeview Ter., Easthampton, NJ (US) 08060

( * ) Notice: Subject to any disclaimer, the term of this patent is extended or adjusted under 35 U.S.C. 154(b) by 115 days.

(21) Appl. No.: 11/845,032

(22) Filed: Aug. 24, 2007

(65) Prior Publication Data

US 2008/0052939 A1 Mar. 6, 2008

Related U.S. Application Data

(60) Provisional application No. 60/824,147, filed on Aug. 31, 2006.

(51) Int. Cl.
*G09B 23/04* (2006.01)
(52) U.S. Cl. .................... 33/453; 235/61 GM; 434/215
(58) Field of Classification Search .................. 33/419, 33/420, 421, 422, 424, 425, 426, 453, 536, 33/537; 235/61 GM; 434/211, 212, 214, 434/215; 708/811, 812; D10/64, 65
See application file for complete search history.

(56) References Cited

U.S. PATENT DOCUMENTS

| | | | | |
|---|---|---|---|---|
| 200,060 A | * | 2/1878 | Hitt | 33/425 |
| 318,578 A | * | 5/1885 | Patterson | 33/425 |
| 1,541,179 A | * | 6/1925 | Parkinson | 434/215 |
| 1,955,392 A | * | 4/1934 | Shimberg | 33/453 |
| 2,461,795 A | * | 2/1949 | Williamson | 33/419 |
| 2,582,080 A | * | 1/1952 | Stroukoff et al. | 33/1 SB |
| 3,014,646 A | * | 12/1961 | Zenith | 235/61 R |
| 3,122,314 A | * | 2/1964 | Graham | 235/61 GM |
| 3,345,752 A | * | 10/1967 | Gabriel | 33/456 |
| 3,359,654 A | * | 12/1967 | Boyte | 434/215 |

(Continued)

FOREIGN PATENT DOCUMENTS

JP 2007249926 A * 9/2007

(Continued)

OTHER PUBLICATIONS

Derwent Acc No. 2008-M68485, clipped image and abstract for CN 201126650 Y, inventor Sun; title "Acute angle trigonometric function exhibiting teaching appliance, has rotatable sloping side mounted on base, where end point of sloping side intersects with movable right-angle side", published Oct. 1, 2008, IPC G09B 23/04.*

*Primary Examiner*—R. Alexander Smith
(74) *Attorney, Agent, or Firm*—Fox Rothschild LLP

(57) ABSTRACT

An apparatus for displaying or measuring a trigonometric sine or cosine is provided, which includes a planar surface with a circle or a portion thereof and a bisecting line through the center of the circle. Two arms are attached to the apparatus. The circle, bisecting line and second arm include incremental markings that correspond to the degree and/or radian measurements of the unit circle, trigonometric cosine and trigonometric sine, respectively. A method is also provided which includes rotating one of the arms to a position along the circle to form an angle. Based upon the position of the first and second arms the trigonometric cosine and trigonometric sine of the angle can be read. An electronic display device that displays the trigonometric sine and trigonometric cosine of an angle can also be included.

4 Claims, 3 Drawing Sheets

U.S. PATENT DOCUMENTS

| | | | | |
|---|---|---|---|---|
| 3,414,190 | A | * | 12/1968 | Lemiesz ................ 235/61 GM |
| 3,556,397 | A | * | 1/1971 | Andersen et al. ....... 235/61 GM |
| 3,610,519 | A | * | 10/1971 | Radosavljevic et al. ....... 235/51 |
| 3,814,903 | A | * | 6/1974 | Jankowiak ............. 235/61 GM |
| 3,826,021 | A | * | 7/1974 | De Andrea ................. 434/215 |
| 3,860,791 | A | * | 1/1975 | Headle, Jr. ................. 235/403 |
| 4,208,804 | A | * | 6/1980 | Lundin ....................... 33/418 |
| 4,435,162 | A | * | 3/1984 | Schoenwald ............... 434/215 |
| D342,685 | S | * | 12/1993 | Stokes ......................... D10/64 |
| D409,098 | S | * | 5/1999 | Michaeli ..................... D10/64 |
| 6,941,667 | B2 | * | 9/2005 | Bauldock, Sr. ............... 33/472 |

FOREIGN PATENT DOCUMENTS

| | | | |
|---|---|---|---|
| SU | 995111 | A * | 2/1983 |
| SU | 1166305 | A * | 7/1985 |

\* cited by examiner

APPARATUS AND METHOD FOR MEASURING THE TRIGONOMETRIC COSINE AND TRIGONOMETRIC SINE OF AN ANGLE

CROSS-REFERENCE TO RELATED APPLICATION

The present application claims priority benefit under 35 U.S.C. §119(e) of U.S. Provisional Patent Application Ser. No. 60/824,147, filed Aug. 31, 2006, the disclosure of which is incorporated herein by reference.

FIELD OF INVENTION

The invention relates to measuring devices. More specifically it relates to displaying the trigonometric sine and trigonometric cosine of an angle.

BACKGROUND

There are in existence such things as protractors, rulers and straight edges to measure geometrical figures. Slide rules are also known in the art and are used to perform various calculations using analog scales. Traditionally the values for trigonometric sine and cosine are accessed in printed tables or on an electronic calculator. However, these trigonometric functions generally vanish from the mind as quickly as they entered it.

It would be desirable to provide an apparatus that provides the user with a visualization of the sine and cosine as they work on various computations and measurements. It would therefore be desirable to provide a tool which can simply display the values of trigonometric sine and cosine in a readily recognizable and understandable format to provide the user with a better understanding and allow for longer retention of the basic foundations of trigonometry.

SUMMARY

A method and apparatus for displaying the trigonometric sine and trigonometric cosine of an angle in a readily recognizably and understandable format is provided. The apparatus comprises a planar surface imprinted with a circle or a portion thereof, and a bisecting line through the center of the circle. Additionally, two arms are attached to the apparatus. The first arm is pivotally joined to the origin of the circle and the second arm is pivotally joined to the first arm at the intersection point of the first arm and the circle. The circle, bisecting line and second arm are marked incrementally to correspond to the degree and/or radian measurements of the unit circle, trigonometric cosine and trigonometric sine, respectively. This allows the first arm to be set to a desired angle or to be used as a protractor to measure an actual angle, and allows the cosine to be read from the markings on the bisecting line and the sine to be read from the markings on the second arm when it is positioned perpendicular to the bisecting line.

In another aspect, the invention provides a method of visually determining a sine and cosine of an angle. One method according to the invention comprises rotating the first arm to a position along the circle to form the desired angle. Based upon the position of the first arm, the trigonometric sine and trigonometric cosine of the angle can be read from the markings on the second arm and bisecting line, respectively, when the second arm is arranged perpendicular to the bisecting line.

In another aspect of the invention, an electronic controller is provided that is connected to the device. Preferably an encoder or other electronic sensor is connected to the first arm and/or the base for detecting a relative angle between the first arm and the bisecting line. An electronic display device is connected to the controller and preferably displays the trigonometric sine and cosine of the angle formed by the first arm. The degree and/or radian values for angle are also preferably displayed. Additional mathematical calculations may also be performed by the controller and displayed on the display, for example, standard calculator functions that are input by a keypad connected to or provided on the device which communicate with the controller.

BRIEF DESCRIPTION OF THE DRAWING

The foregoing summary, as well as the following detailed description of the preferred embodiments of the invention, will be better understood when read in conjunction with the appended drawings. For the purpose of illustrating in the invention, there are shown in the drawings embodiments which are presently preferred. It should be understood, however, that the invention is not limited to the precise arrangements shown.

DETAILED DESCRIPTION OF THE PREFERRED EMBODIMENTS

Figure 1:
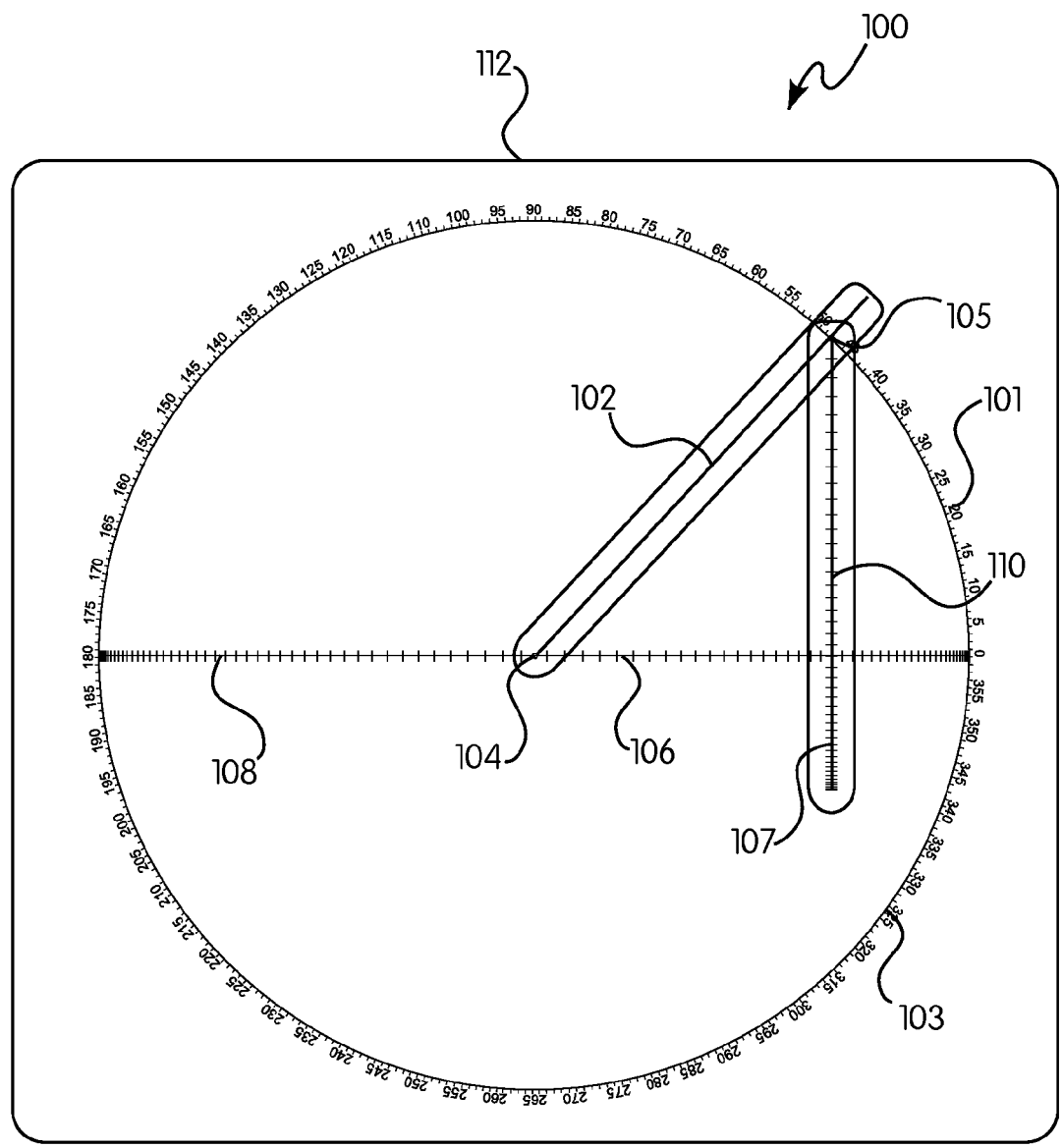
FIG. 1 is a plan view of a first embodiment of an apparatus for displaying the trigonometric sine and trigonometric cosine of an angle.

Certain terminology is used in the following description for convenience only and is not considered limiting. The words "lower" and "upper" designate directions in the drawings to which reference is made. The words "vertical" and "horizontal" indicate generally perpendicular directions which, with reference to the apparatus according to the invention. Additionally, the terms "a" and "one" are defined as including one or more of the referenced item unless specifically noted.

FIG. 1 shows an apparatus 100 for displaying the trigonometric sine and trigonometric cosine of an angle. The apparatus 100 comprises a planar surface 112 inscribed with a circle 101, or a portion thereof, and a bisecting line 108 extending from a first side through the origin 104 of the circle 101 to the second side of the circle 101. The bisecting line 108 is preferably parallel with an edge of the planar surface 112. The circle 101 preferably includes incremental markings 103 with degree and/or radian notations in a manner similar to a protractor. The bisecting line 108 extends for the full diameter of the circle 101. It preferably includes incremental markings 106 with the notation for trigonometric cosine.

A first end of a first arm 102 is pivotally attached to the planar surface 112 at the origin of the circle 101 so that it can rotate freely around the origin which defines a pivot point 104. The pivot can be formed by any suitable means, such as a rivet or other type of fastener. A second arm 107 is pivotally attached to the second end of the first arm 102 at a pivot point 105 defined at the intersection of the central axis of the first arm 102 and the circle 101. The second arm 107 can preferably rotate freely around the pivot point 105. The second arm 107 includes incremental markings 110 with notations for trigonometric sine values. Preferably the planar surface 112 with the circle 101, the first arm 102 and the second 107 arm are manufactured from a synthetic transparent or semi-transparent material, such as a clear plastic.

Figure 2A:
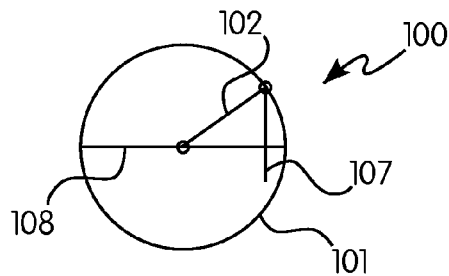
FIGS. 2a-2h are a series of views showing the positions of the first and second arms for determining the sine and cosine of various indicated angles.
Figure 2B:
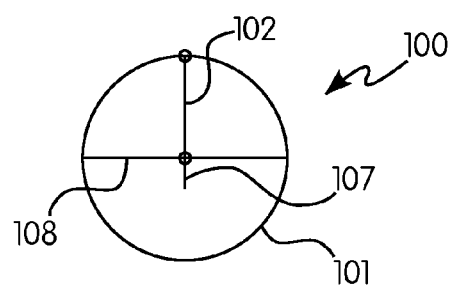
Figure 2C:
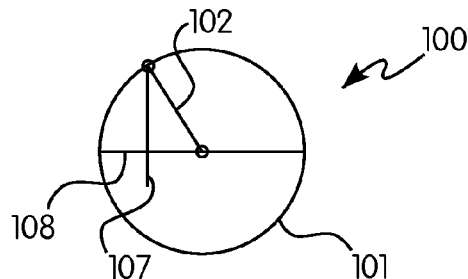
Figure 2D:
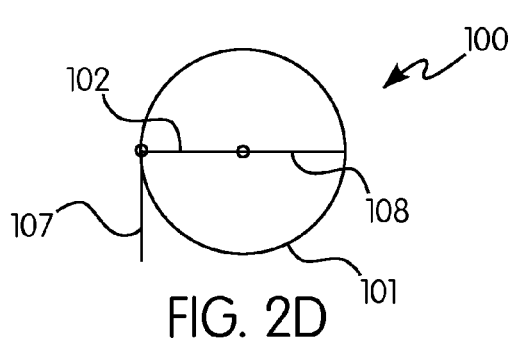
Figure 2E:
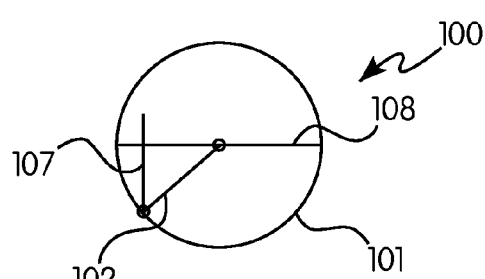
Figure 2F:
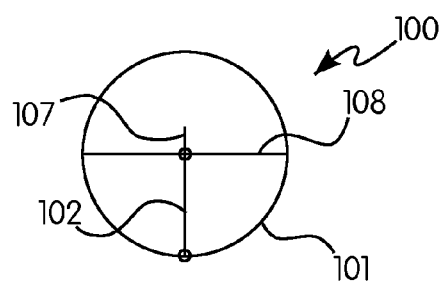
Figure 2G:
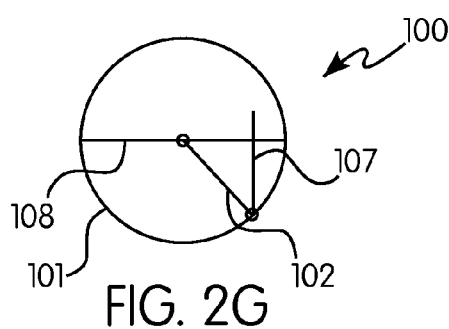
Figure 2H:
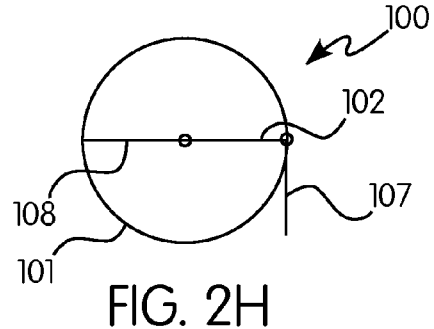

The apparatus 100 is used by rotating the first arm 102 to a desired position in order to define the angle to be analyzed, and positioning the second arm 107 perpendicular to the bisecting line 108 in the quadrant for the angle being measured. The arm positions for the first quadrant are shown in FIGS. 2a and 2b. The arm positions for the second quadrant are shown in FIGS. 2c and 2d. The arm positions for the third quadrant are shown in FIGS. 2e and 2f. The arm positions for the fourth quadrant are shown in FIG. 2g, and the arm positions for zero degrees are shown in FIG. 2h. Of course, if only a partial segment of the circle is used, for example the first quadrant, the sine and cosine values for the second, third and fourth quadrants could be interpolated from the corresponding values in the first quadrant according to known trigonometric principles.

The first arm allows for a clear visualization of the angle or even measuring of the angle in a similar manner to a protractor. Once at the desired position, the trigonometric sine of the angle is preferably read from the markings 110 on the second arm 107 at the intersection of the second arm 107 with the bisecting line 108. The trigonometric cosine can be read from the markings 106 on the bisecting line 108 at the intersection of the bisecting line 108 and the second arm 107.

Existing geometric figures can be measured to find the angle, trigonometric sine and cosine simultaneously in a single operation or a desired geometric figure whose angle is known can be constructed in a similar operation.

Figure 3:
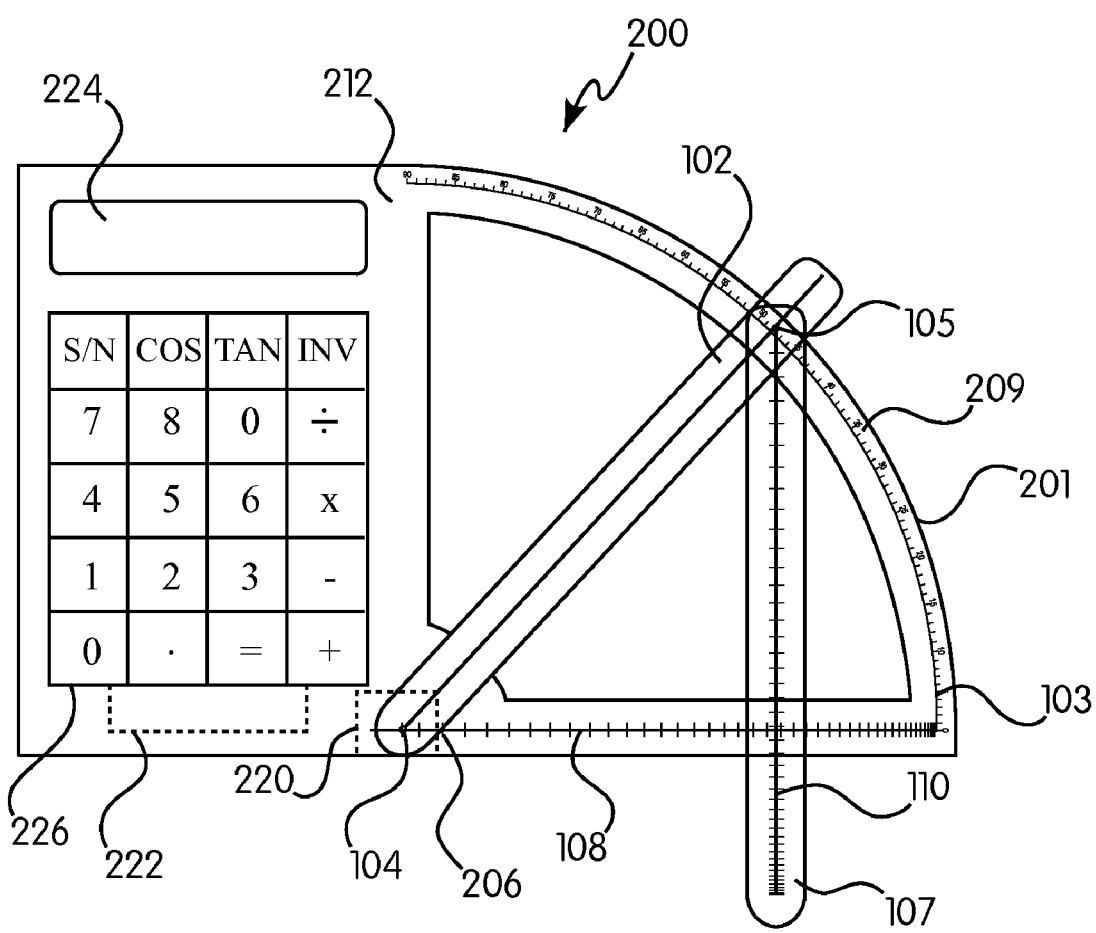
FIG. 3 is a plan view of a second embodiment of the apparatus for displaying trigonometric sine and cosine values of an angle according to the invention.

Referring now to FIG. 3, a second embodiment of the display tool 200 for determining a sine or cosine of an angle is shown. The second embodiment 200 is similar to the first embodiment 100; however, it only includes the first 90° segment of a circle 201. The first and second arms 102, 107 are the same as in the first embodiment. The bisecting line 208 only extends horizontally from the origin to the right side of the circle segment 201, and includes the cosine markings 206. A sensor or encoder 220 for determining an angular position of the first arm 102 relative to the bisecting line 208 is provided and is connected to a control module 222. The control module 222 is preferably a PLC or IC based control module that can receive signals from the sensor or encoder 220 and calculate the sine and/or cosine of the angle between the first arm 102 and the bisecting line 208 as well as optionally the tangent and the actual angle in degrees or radians. This can be displayed on a display 224, which can be an LCD, LED or other suitable display. Preferably, a calculator keyboard 226 is also provided and is connected to the control module 222 so that other functions and mathematical calculations can be performed. A power source (not shown) is provided, such as a battery or connection to an outside electrical source for operating the control module 222 and the various functions. The control module 222, display 224, and keyboard 226 are preferably integrated into a housing 212, which includes a clear portion in the area of the arms 202, 207 so that the sine and cosine can still be manually determined, if desired, and direct angle measurement by aligning the first arm 102 with a desired angle or figure can be carried out.

While one particular keyboard layout 226 has been shown, those skilled in the art will recognize that this can be changed to suit particular applications, and the invention is not limited to the arrangement shown.

Although the presently preferred embodiments of the invention have been described in detail, the invention is not limited to the specific embodiments described above, which should be considered as merely exemplary. Further modifications and extensions of the present invention may be developed, and all such modifications are deemed to be within the scope of the present invention.

What is claimed is:

1. A display tool comprising:
a planar surface with at least a portion of a circle and a bisecting line through the center of the circle located thereon;
a first arm pivotally joined to the planar surface at an origin of the circle, which extends from the origin of the circle to an edge of the circle;
a second arm pivotally joined to the first arm; and
a control module that determines at least one of a sine and a cosine of the angle;
a sensor that detects an angle of the first arm, the sensor is in communication with the control module; and
a display connected to the control module that displays the at least one of the sine and the cosine;
wherein the circle, bisecting line and second arm include markings located at specific increments;
wherein the markings located on the circle correspond to degree or radian values;
wherein the markings located on the second arm correspond to trigonometric sine values; and
wherein the markings located on the bisecting line correspond to trigonometric cosine values.

2. The display tool of claim 1, wherein the markings located on the circle correspond to radian values.

3. The display tool of claim 1, wherein the planar surface is transparent.

4. The display tool of claim 1, wherein the planar surface comprises the portion of a circle consisting of the first quadrant.

* * * * *